United States Patent [19]

Yamanaka et al.

[11] Patent Number: 4,807,259
[45] Date of Patent: Feb. 21, 1989

[54] TIME SYNCHRONIZATION METHOD IN DATA TRANSMISSION SYSTEM

[75] Inventors: Torao Yamanaka; Teruhisa Shoyama; Nobuo Teraji, all of Hyogo, Japan

[73] Assignee: Mitsubishi Denki Kabushiki Kaisha, Tokyo, Japan

[21] Appl. No.: 50,576

[22] Filed: May 18, 1987

[30] Foreign Application Priority Data

May 20, 1986 [JP] Japan ................................ 61-115662
Jun. 20, 1986 [JP] Japan ................................ 61-142780

[51] Int. Cl.$^4$ ............................................. H04L 7/00
[52] U.S. Cl. ..................................... 375/109; 375/106; 370/85; 370/110.1; 340/825.06
[58] Field of Search ................. 375/106, 36, 107, 109, 375/110; 370/56, 85, 100, 110.1; 340/825.06, 825.08, 825.14, 825.2, 825.52

[56] References Cited

U.S. PATENT DOCUMENTS

| | | | |
|---|---|---|---|
| 3,872,437 | 3/1975 | Cross | 340/825.14 X |
| 3,940,558 | 2/1976 | Gabbard et al. | 375/109 X |
| 4,357,701 | 11/1982 | Canniff | 370/56 X |
| 4,377,859 | 3/1983 | Dunning et al. | 370/58 |

FOREIGN PATENT DOCUMENTS

57-69496 4/1982 Japan .

Primary Examiner—A. D. Pellinen
Assistant Examiner—Derek S. Jennings
Attorney, Agent, or Firm—Bernard, Rothwell & Brown

[57] ABSTRACT

A method for synchronizing the times of a master clock provided in the master station and slave clocks provided in the slave stations in a data transmission and receiving system consisting of the master station as a data transmission control station and slave station and/or stations for two-way data transmission. An encoded time survey command including master clock time is transmitted from the master station to each slave station. This is followed by an encoded response from each slave station which includes the slave clock time, from which the transmission delay to and from the slave station is determined along with the time difference between master and slave clocks. Time correction data is then transmitted to correct the time of the slave station clock.

4 Claims, 8 Drawing Sheets

TIME SYNCHRONIZATION METHOD IN DATA TRANSMISSION SYSTEM

BACKGROUND OF THE INVENTION

1. Field of the Invention

The present invention relates to a time synchronization method in a data transmission system and particularly to a time synchronization method to synchronize times of clocks respectively provided at both master station and distant slave station or stations which are transmitted bidirectional data transmissions, by means of the data transmission line and/or lines.

2. Description of the Prior Art

Necessity for accurate record and analysis of operation times and procedures of respective units such as protection apparatus, for example, of electrical power generating facilities, power transmission facilitites or power substation facilities of various electrical stations located in a broad region becomes increasingly apparent with sophisticated operations of electrical power systems in recent years.

In addition, it is also necessary to synchronize the timing for sample-holding of the metering data in the slave station located in different points on the occasion of collecting the metering data at each electrical station to the master station through the data transmission line. Therefore, assumed here as a data transmission system, for example, is the method that the bidirectional data transmission is carried out between the master station and each slave station using the polling/selecting system, a clock circuit is respectively provided to the master station and each slave station of the transmission system, the operation data of various units such as said protection apparatus is transmitted with the code of time of such clock circuits, data is measured simultaneously in each slave station at the predetermined time, and such measured data is once stored in the associated memory, etc. and then transmitted to the master station through the transmission line. The polling/selecting system employed here means the centralized control by the master station (generally a computer) provided as the control station for establishment of data link. For example, this system is employed, in such a case that flow of data is controlled by the control station like the multipoint-type system. In case of this system, the master station transmits the polling code including slave station address in accordance with a predetermined format in order to urge the slave station (normally, a terminal) as the mate station for calling to send data. Moreover, in case of sending data from the master station, the master station issues a selecting code including slave station address to each slave station to make preparation for reception.

In the time synchronization as described above, it is important that the clock circuits of the master and slave stations are synchronized within a range of error that does result not in a problem for practical use. However, since the time required for data transmission has come to exceed by far the time within the allowable error range, particular measures have been required for the method of synchronization. As an example, there is a "remote supervisory control apparatus" described in Japanese Laid-open Patent No. 57-69496 applied to the Patent Office in Japan by MITSUBISHI DENKI KABUSHIKI KAISHA (Mitsubishi Electric Co., Ltd.), and laid open on Apr. 28, 1982.

Figure 1:
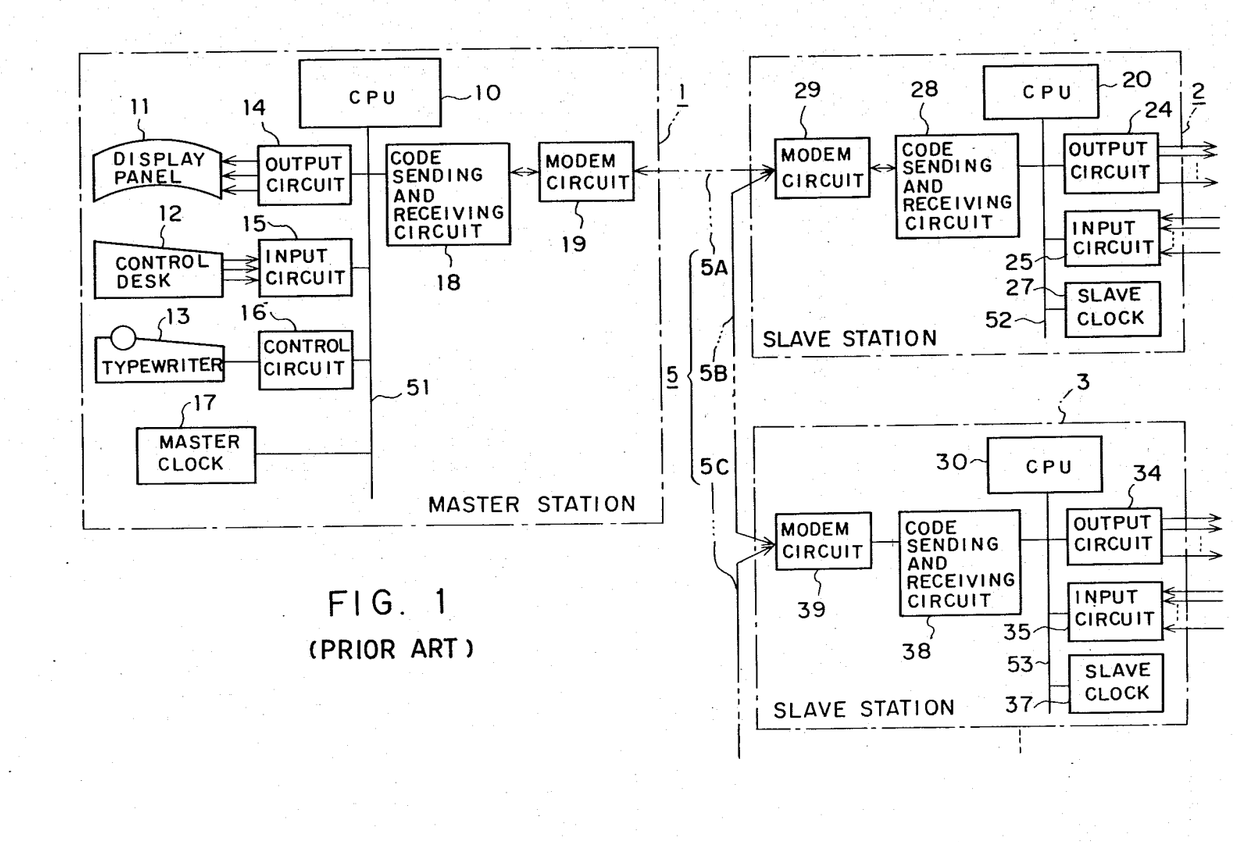
FIG. 1 is a block diagram illustrating an outline of structure of a data transmission system for explaining a time synchronization method of the prior art.

FIG. 1 is a block diagram illustrating the outline of structure of the conventional data transmission system disclosed in the above patent entitled "remote supervisory control apparatus". For example, in this figure, the data transmission system consisting of Supervisory Control And Data Acquisition (hereinafter, abbreviated as SCADA) system comprises a master station 1 as the control station, slave stations 2, 3, . . . as the mate stations of such master station and data transmission path 5 connecting the master station 1 and slave stations 2, 3, . . . The master station 1 comprises a central processing unit (CPU) 10, a display panel 11 which displays conditions of the slave stations 2, 3, . . . , a control desk 12 which sends a control command to the slave stations 2, 3, . . . , a typewriter 13 which records operations of this data transmission system and data sent from slave stations 2, 3, . . . , an output circuit 14 provided between an internal bus 51 connected to the CPU 10 and the display panel 11, an input circuit 15 connected respectively to the internal bus 51 and the control desk 12, a typewriter control circuit 16 connected respectively to the internal bus 51 and the typewriter 13, a master clock 17 which is connected to the internal bus 51, a code sending and receiving circuit 18 which is connected to the internal bus 51, and a modem circuit 19 which forms the data transmission path 5 and is provided between external bus 5A which connects the master station 1 and slave station 2 and said code sending and receiving circuit 18.

Meanwhile, the slave station 2 or 3 comprises a CPU 20 or 30 which performs processings such as transmission and reception of data with an electrical station to which a slave station is provided and with the master station, an internal bus 52 or 53 connected to the CPU 20 or 30, an output circuit 24 or 34 which is connected to such internal bus 52 or 53 and provides a measuring command, etc. to an electrical station, etc. to which a slave station is provided, an input circuit 25 or 35 which is connected to the internal bus 52 or 53 and inputs measured data, etc. of the electrical station, etc., a slave clock 27 or 37 which is connected to the internal bus 52 or 53, a code sending and receiving circuit 28 or 38 which is connected to the internal bus 52 or 53, and a modem circuit 29 or 39 which is provided between such code sending and receiving circuit 28 or 38 and the external lines 5A and 5B or 5B and 5C which form said data transmission path 5.

Figure 2:
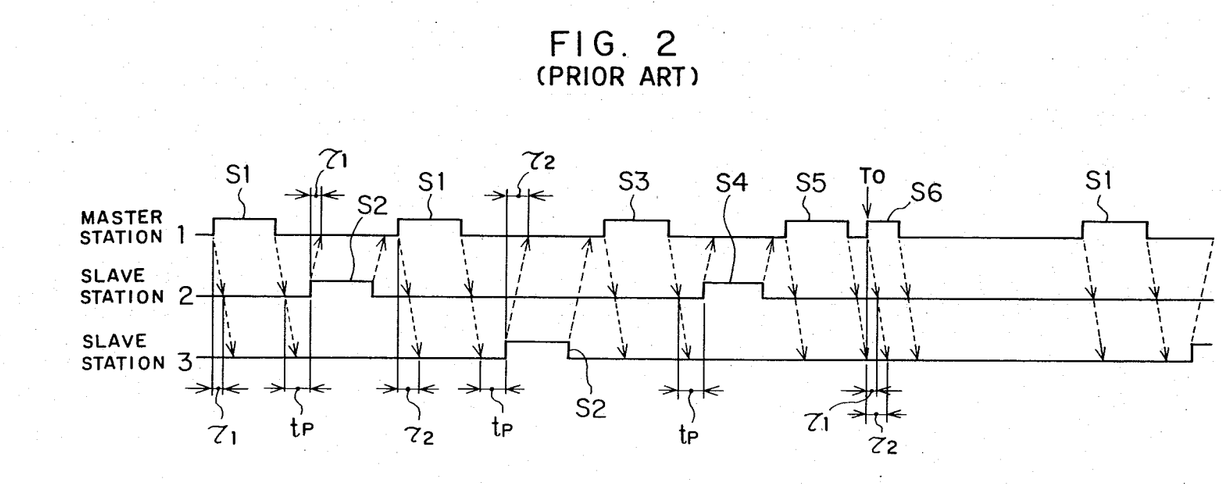
FIG. 2 is a time chart of two-way data transmission between the master station and slave stations in the data transmission system of FIG. 1.

Operations of the data transmission system based on such structure will now be explained. FIG. 2 illustrates a time chart of codes transmittedand received between the master station 1 and the slave stations 2, 3, . . . . The code transmitted by the master station 1 is illustrated at the uppermost part and the codes transmitted by the slave stations 2 and 3 are also illustrated respectively at the intermediate and lower portions. In the sending code of the data transmission system, there is the polling signal S1 which is sequentially transmitted from the sending and receiving circuit 18 of the master station 1 to the slave station 2 or 3. This polling signal S1 reaches the slave station 2 after a transmission delay time $\tau_1$ and the slave station 3 after a transmission delay time $\tau_2$, through the modem circuit 19 and data transmission path 5.

On the other hand, at each slave station 2 or 3 the, status of contacts to be watched such as the auxiliary contacts, for example, of protection relay or circuit breaker, etc. is input to the input circuit 25 or 35, and status change of the contacts may be detected by the CPU 20 or 30 through the periodical scanning for the input circuit 25 or 35. If such status change is detected, such input address number and novel state are stored within the memories (not illustrated) of respective slave stations 2 or 3 with the time data of such status change read by the slave clock 27 or 37. If it is assumed here that the polling signal S1 is destined; for example, to the slave station 2, CPU 20 returns the content of status change stored in the memory (not illustrated) and the detection time of such status change (on message stating that there is no status change if status change is not detected to the master station 1 as the return code S2. This return code S2 is transmitted from the code sending and receiving circuit 28 after a constant time $t_P$ from completion of reception of the polling signal S1 and is then transmitted to the master station 1 through the modem circuit 29 and external bus 5A. As illustrated in FIG. 2, the return code S2 from the slave station 2 reaches the code sending and receiving circuit 18 of master station 1 after a transmission delay time $\tau_1$, while the return code S2 from the slave station 3 reaches said circuit 18 after the transmission delay time $\tau_2$.

Operations in the master station 1 will now be explained. Upon reception of the return code S2 from the slave station 2 or 3 through the code sending and receiving circuit 18, CPU 10 updates stored contents of a memory (not illustrated) within the master station 1. Moreover, CPU 10 renews the display on the display panel 11 through the output circuit 14 and then records status changes of the slave station 2 or 3 by operating the typewriter 13 through the typewriter control circuit 16.

CPU 10 of the master station 1 encodes the address and the state to be controlled (for example, ON/OFF status of switch) of the facilities in an electrical station, for example, to which a relevant slave station, for example, like the slave station 2 is provided, on the basis of on input from the control desk 12 through the input circuit 15 and then outputs this code to the code sending and receiving circuit 18. This code sending and receiving circuit 18 receives the information from CPU 10 and sends a selection/control code S3 to the corresponding slave station, for example, the first slave station 2 in place of the polling signal. At the slave station, the code sending and receiving circuit 28 or 38 receives this selection/control code S3 and in case the first slave station 2, for example, is selected, the code sending and receiving circuit 28 of such slave station 2 receives such selection/control code S3 and gives a control command to the facilities, for example, of an electrical station to which said first slave station 2 is provided through the output circuit 24. When the relevant facilities respond to this command, the code sending and receiving circuit 28 sends the code as an answer code S4 as in the case of the return code S2 based on said status change. In this case, transmission is carried out, as is obvious from FIG. 2, by the code sending and receiving circuit 28 after a constant time $t_P$ from reception of the selection/control code S3 and thereby the code S4 is transmitted to the master station 1 through the modem circuit 29 and external bus 5A.

Explanation and illustration for the third and the succeeding slave stations are omitted but structure and operation of these slave stations are exactly the same as those of the first and second slave stations 2 and 3 described previously.

In case of analyzing conditions of the system considered as the object of supervisory control based on the data collected through such ordinary remote supervisory control operations, the time information sent from the slave station 2 or 3 must be accurate and accordingly, the time setting is carried out periodically (for example, once at twelve o'clock midnight in every day) to the slave clocks 27, 37 of slave stations 2, 3 for time synchronization to the master clock 17.

Namely, CPU 10 of the master station 1 transmits the time setting code S5, encoded time $T_0$ to be set (for example, 24 o'clock 00 minute 00 second 000 millisecond), to each slave station 2, 3, . . . through the modem circuit 19 and data transmission path 5 from the code sending and receiving circuit 18 when the preset time approaches. The slave stations 2, 3, . . . having received such time setting code S5 with the code sending and receiving circuits 28, 38 store the time to be set in the memory of CPUs 20, 30 as the preparation for input of a setting command signal S6. CPU 10 of the master station 1 supervises the time of master clock $T_0$ and transmits the setting command signal S6 from the code sending and receiving circuit 18 to the slave stations 2, 3, . . . through the modem circuit 19 and external buses 5A, 5B . . . of data transmission path 5 when the time of master clock reaches the preset time $T_0$. The setting command signal S6 reaches the slave station 2 after the transmission delay time $\tau_1$ from the preset time $T_0$ and to the slave station 3 after the transmission delay time $\tau_2$. When this setting command signal S6 reaches the slave stations, CPU 20 of the slave station 2 sets the time of slave clock 27 to $T_0+\tau_1$, while CPU 30 of the slave station 3 sets the time of slave clock 37 to $T_0+\tau_2$. Here, the slave stations 2, 3, . . . measure the transmission delay times $\tau_1, \tau_2, \ldots$ and store such delay times to the memory of CPUs 20, 30, . . . and then add to the designated setting time $T_0$ by the time setting code S5.

Upon completion of processing for time setting, CPU returns again to the remote supervisory control operation by sending the polling signal S1.

Since the conventional time synchronization method of the prior art is thus constituted, it accordingly results in the problem that the time synchronization is carried out on a real time basis, operations do not have allowance, the CPUs of the master station and slave stations hold the other operations and must execute only the operations of time synchronization.

Moreover, the prior art described previously also has provided a problem that a transmission delay time between the master station and slave stations must be measured previously and stored as the data in CPU and if the transmission route is changed, these operations must be carried out again.

In addition, there has been a problem that the system which always periodically executes data transmission and transmission of time synchronization signal on a real time basis requires temporary stop of data flow.

SUMMARY OF THE INVENTION

It is an object of the present invention to provide a time synchronization method in the data transmission system in which neither extra transmission line for the time synchronization is necessary nor interruption/heavy loading to CPU is necessary for the time synchronizing operation.

It is the second object of the present invention to provide a time synchronization method in the data transmission system, especially in a polling/selecting system—in which the procedures of separately measuring a transmission delay time are eliminated and any modification of the transmission delay time data is not required when the transmission route is changed.

It is the third object of the present invention to provide a time synchronization method in the data transmission system in which time synchronization can be established between the master clock of the master station and slave clocks of the slave stations under the condition that flow of data transmission is not stopped but continued, not only in case, the system executes the data transmission by polling/selection but also in the case of automatic cyclical transmission.

In order to achieve the objects described previously, the time synchronization method in the data transmission system to which the present invention pertains discloses that a slave station transmits a code of slave clock time data to the master station in accordance with the code of slave clock time survey command sent from the master station, the master station calculates the time difference between the master clock and the slave clock taking the transmission procedure and the transmission delay time into consideration, such time difference is transmitted to the slave station as the code of time correction data, and the time of slave clock is corrected in the slave station in accordance with time difference received from the master station and thereby the times of master clock and slave clocks are synchronized.

As described above, on the occasion of correcting difference between the times indicated by the master station and slave station on the basis of the transmission delay time between the master station and slave stations, calculation of time correction data is carried out as explained below and the time of slave clock is corrected and synchronized with the master clock on the basis of such time correction data. Namely, the time of slave clock is read at a constant predetermined time before the partition of the frame which divides the flow of data to be transmitted and is stored in the register; the time stored in the register is transmitted as the data during the frame following such partition; the master station stores in the register the time of the master clock when it has received the frame, calculates an estimated time of the slave clock by subtracting the sum of the length of the 1-frame of code, the constant predetermined time and transmission delay time from the stored time, transmits the difference, as the time correction data, between such estimated time and the time of said slave clock input as the data from the slave station, and the slave station receives such data and synchronizes the slave clock to the master clock by adding this difference to the time of this slave clock in order to correct the time.

Furthermore, deviation of synchronized time between the master clock and slave clocks can be corrected by the following procedures. A slave station transmits the time of the slave clock, which has been read at a predetermined constant time before the partition of the frame of code being transmitted to the master station and stored in the register, as the data in frame following such partition in accordance with the time survey command sent from the master station, while the master station stores the time of the master clock in such a timing of having received the frame to the register and then calculates an estimated time of slave clock which is equal to that obtained by adding a sum of the transmission delay time, the time up to transmission of code from readout of time of the slave clock and length of code 1 frame to the time of the slave clock which has been input as the data from the slave station, transmits the difference between the estimated time of slave clock and the time of the master clock at the time the frame is received the slave station as the time correction data, and the slave station receives such time correction data and synchronizes the slave clock to the master clock by adding the difference to the time of the slave clock for correction.

DETAILED DESCRIPTION OF THE PREFERRED EMBODIMENTS

The preferred embodiments of the time synchronization method in the data transmission system to which the present invention pertains are described in greater detail with reference to the accompanying drawings.

Figure 3A:
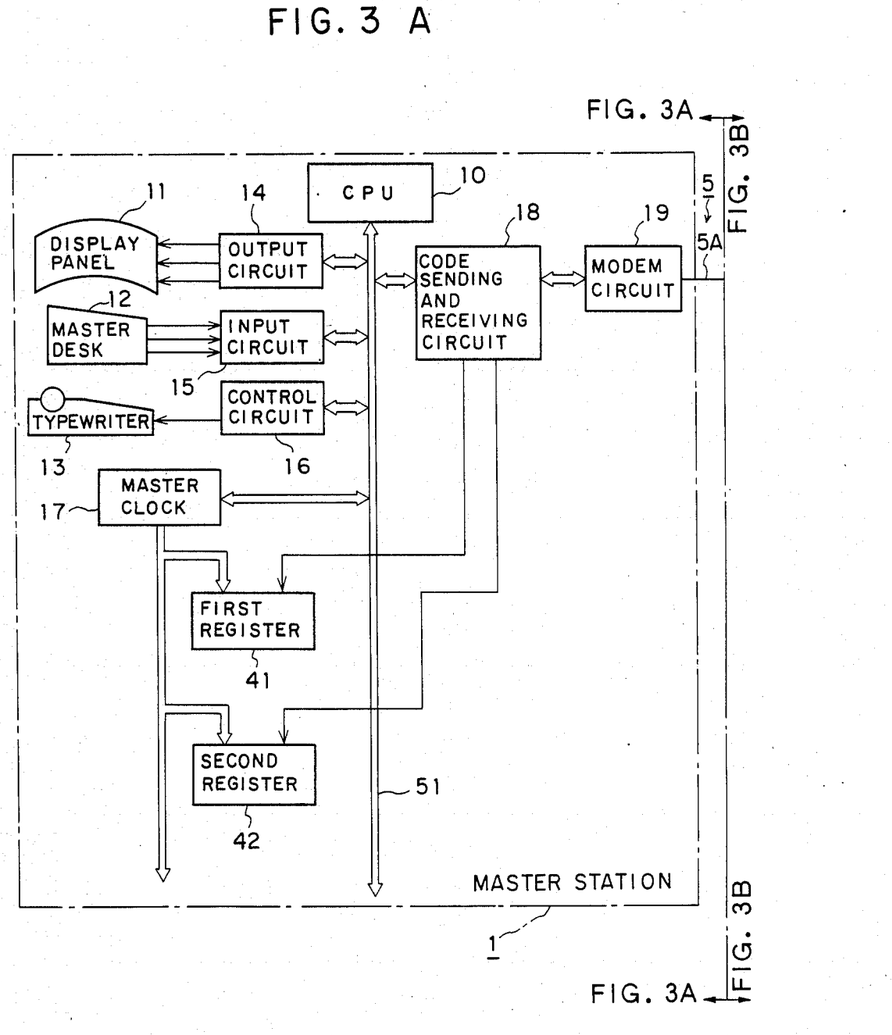
FIG. 3A and 3B are a block diagram illustrating an outline of structure of the data transmission system to which the time synchronization system by the first embodiment of the present invention pertains.
Figure 3B:
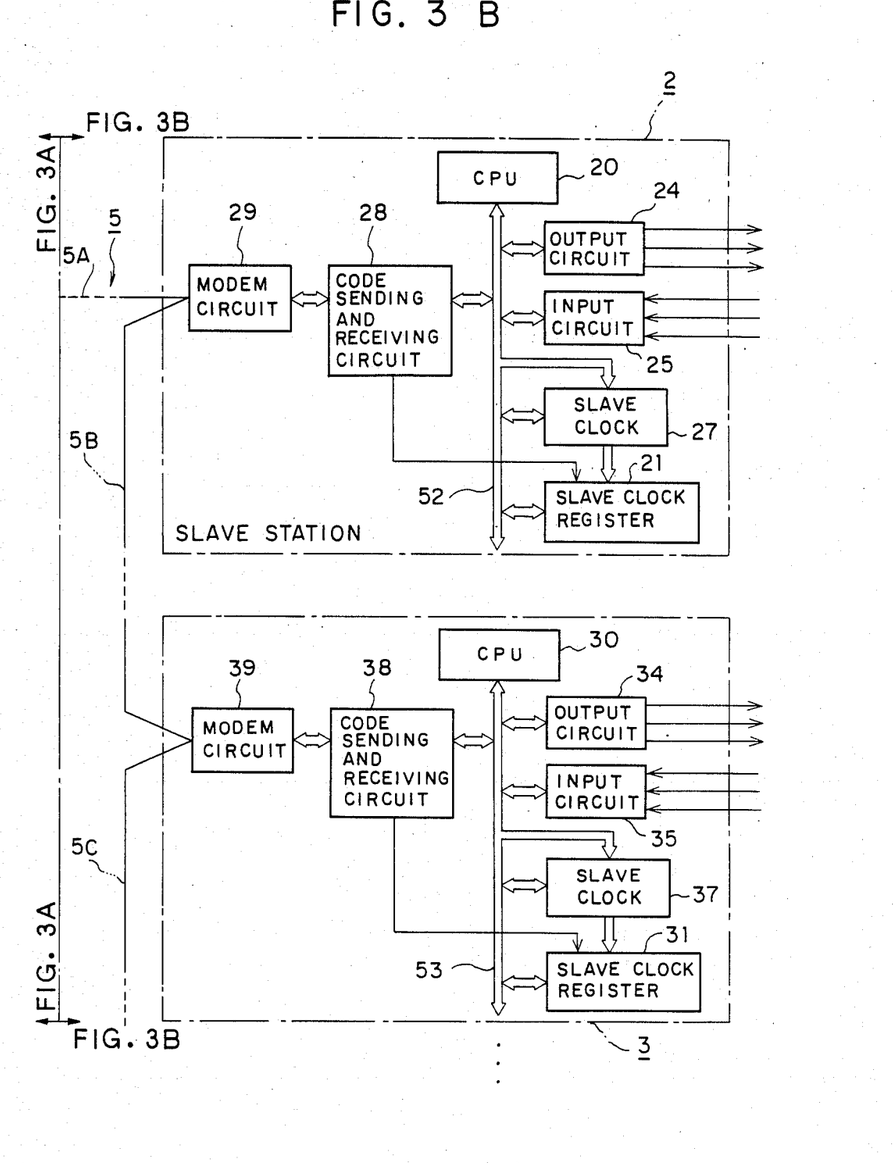
Figure 4:
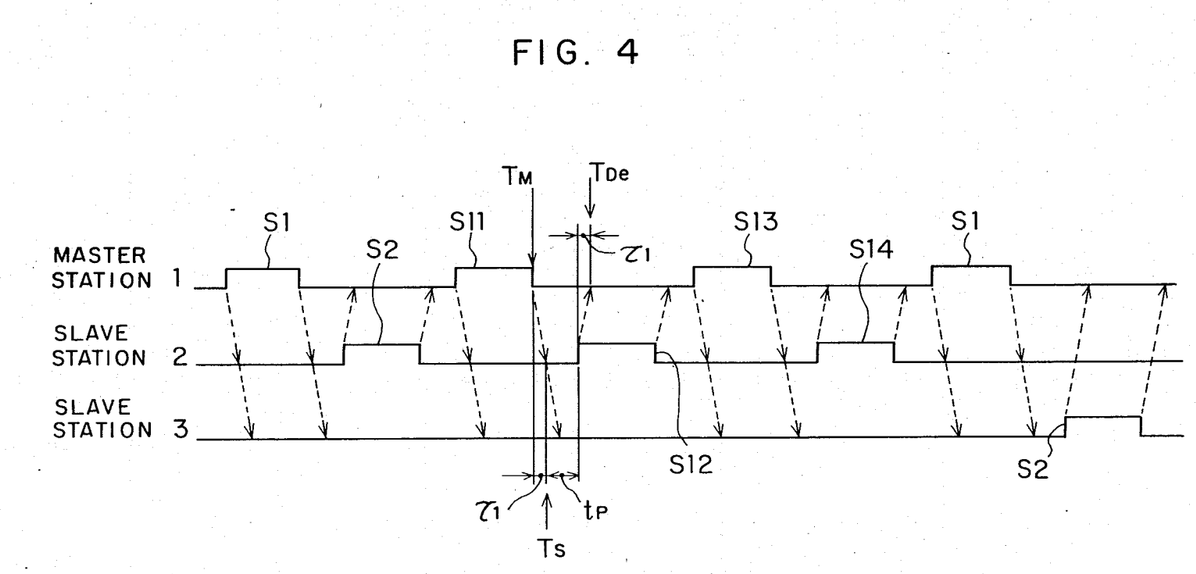
FIG. 4 is a time chart for explaining operations of the system illustrated in FIG. 3.

FIG. 3 and FIG. 4 are provided for explaining the first embodiment of the present invention and components given the same reference numbers as those in FIGS. 1 and 2 indicate the same or corresponding portions in each figure. In FIG. 3, the master station 1 comprises a first register 41 and a second register 42 which are connected with the internal bus 51 and also with the master clock 17 and code sending and receiving circuit 18. In addition, the first slave station 2 comprises a slave clock register 21 connected with the internal bus 52 and also with the slave clock 27 and code sending and receiving circuit 28 and the second slave station 3 also comprises a slave clock register 31 connected with the internal bus 53 and with the slave clock 37 and code sending and receiving circuit 38. In case of FIG. 3, many slave stations such as the third, fourth and the succeeding slave stations (not illustrated) are also connected as in case of FIG. 1.

Operations of the structure described previously are explained hereunder. An ordinary remote supervisory control operation is the same as operations of the prior art. Namely, CPU 10 of the master station 1 executes the processing for time synchronization of slave clock 27 or 37 once in every constant period (there is dispersion from once in every hour to once in every day in accordance with the accuracy of slave clocks 27, 37). FIG. 4 is a time chart which illustrates time relation of the code to be transmitted or received in such a time between the master station 1 and the slave stations 2, 3, . . . . The sending code of master station 1 is indicated at the uppermost part, while the sending codes of the first and second slave stations 2, 3 are indicated at the intermediate and lower parts, respectively.

Here, since operations of slave stations 2, 3 . . . are similar to each other, only the first slave station 2 is explained hereunder.

The code sending and receiving circuit 18 of the master station 1 transmits the code S11 of the slave clock time survey command to the first slave station 2 and stores the time $T_M$ of the master clock 17 upon as completing transmission of code S11 of such slave clock time survey command to the first register 41. The code S11 of said slave clock time survey command reaches the first slave station 2 after the transmission delay time $\tau_1$ and when the code S11 of such slave clock time survey command is received, the first slave station 2 stores the time $T_S$ of the slave clock 27 upon completing transmission in the slave clock register 21. The code S12 of time data of the slave clock which starts transmission after a constant period $t_P$ is transmitted with the time data stored in the slave clock register 21.

In the master station 1, when reception of the code S12 of slave clock time data sent from the slave station 2 after the transmission delay time $\tau_1$ is started, the time $T_{De}$ of the master clock 17 at such start timing is stored in the second register 42.

Thereafter, CPU 10 of the master station 1 calculates the transmission delay time $\tau_1$ between the master station 1 and slave station 2 by the following equation from the time $T_M$ and $T_{De}$ stored in said first and second registers 41, 42.

$$\tau_1 = (T_{De} - t_P - T_M)/2$$

Next, a time difference $T_{D1}$ between the master clock 17 and slave clock 27 is calculated by the following equation considering such transmission delay time $\tau_1$ and it is transmitted to the slave station 2 as the code S13 of the time correction data.

$$T_{D1} = T_M + \tau_1 - T_S$$

When the slave station 2 receives the code S13 of such time correction data, CPU 20 thereof reads the time of the slave clock 27, adds the time difference $T_{D2}$ (including the code) transmitted together with the code S13 of time correction data to such time data and then sets the time of the slave clock 27 to that time.

Thereby, the time of the slave clock 27 is synchronized with the time of the master clock 17.

The slave station 2 sends the certification code S14 to the master station 1 in order to certify time synchronization after setting the time of slave clock 27 and the content of such code is certified in the master station 1.

It is also possible that operations for certification are carried out on the occasion of issuing the next slave clock time survey command and status change or content can be started in place of the certification code S14. Thereafter, operations return to the transmission and reception of code for ordinary remote supervisory control.

Moreover, it is not always required to immediately execute the operation for time correction described above and it is enough that CPU 10 of the master station 1 transmits the code of time correction data S13 in an adequate timing after detecting the time difference between the master clock 17 and slave clock 27 from the code S11 of the slave clock time survey command and the code S12 of the slave clock time data which is an answer to said code S11.

In the abovementioned embodiment, a transmission delay time is once calculated and then time difference is obtained based on such delay time, but the same result can also be obtained by the procedures that it is calculated directly by substituting the equation for obtaining the transmission delay time to the equation for obtaining time difference from the times of the first and second registers, time of slave clock register and a constant period up to the transmission start of code of slave clock time data in a slave station.

In addition, since transmission delay time can be calculated anytime by each transmission of polling signal and reception of return signal thereto, time difference can be calculated immediately, for example, by storing the data of several times of transmission and reception in the past and abnormal value resulting from disturbance of code due to a noise can be excepted from data.

Figure 5A:
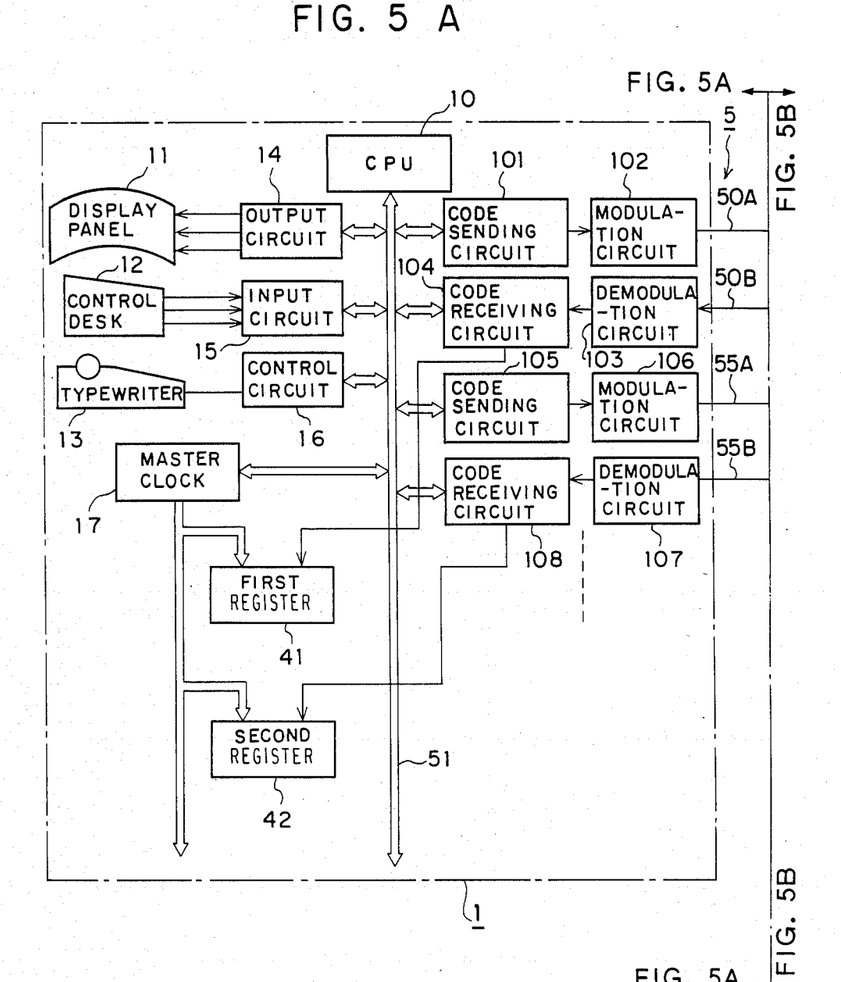
FIG. 5A and 5B are a block diagram illustrating an outline of structure of Supervisory Control And Data Acquisition (hereinafter referred to as SCADA) system to which the time synchronization method by the second embodiment of the present invention pertains.
Figure 5B:
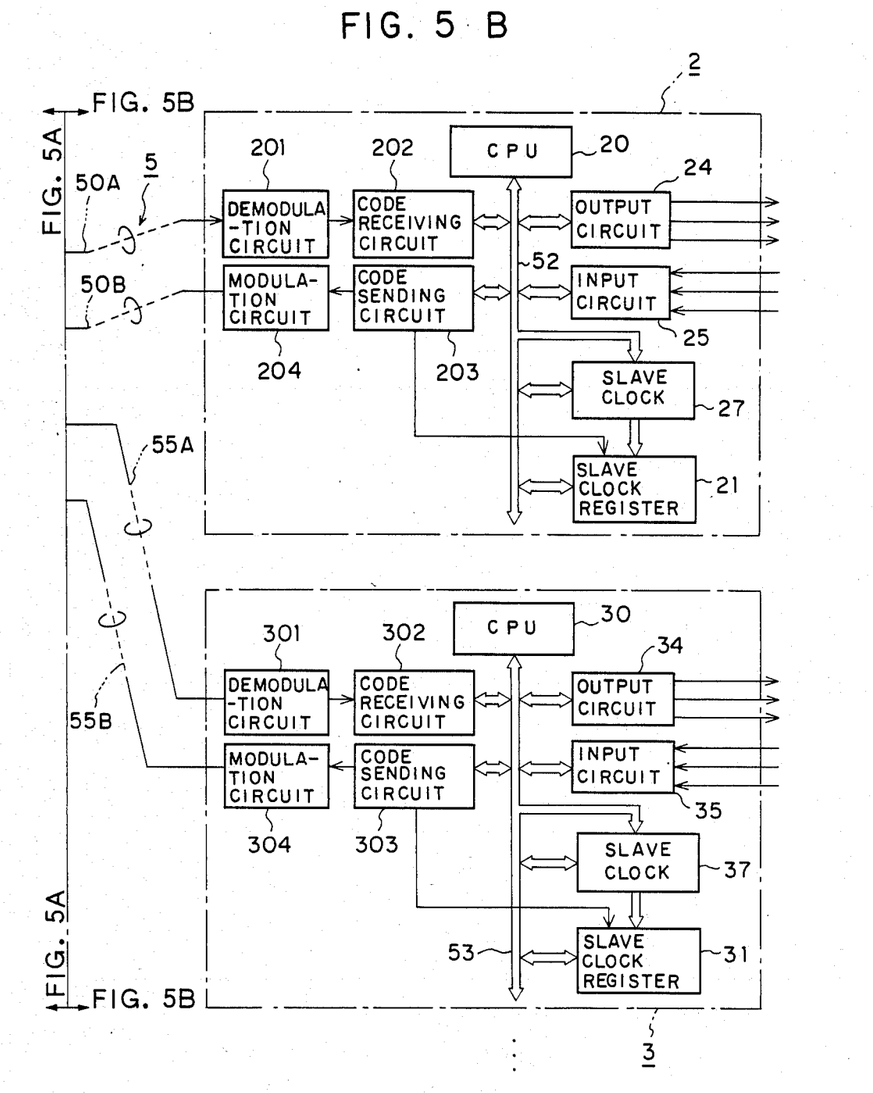

Next, the second embodiment of the present invention will be explained by referring to FIG. 5 and FIG. 6. This second embodiment relates to the time synchronization of the master clock 17 and slave clocks 27 and 37 between the master station 1 and first and second slave stations 2 and 3 forming Supervisory Control And Data Acquisition (so-called, SCADA) system. In FIG. 5, elements corresponding to those in FIG. 1 or FIG. 3 are given like reference numerals. In the same figure, the the master station 1 comprises a code sending circuit 101 for data transmission with the first slave station 2, a modulation circuit 102 provided between such code sending circuit 101 and external line 50A forming the data transmission path 5, a demodulation circuit 103 connected to an external line 50B for returning the data sent from the first slave station 2 and a code receiving circuit 104 provided between such demodulation circuit 103 and the internal bus 51. Moreover, the master station 1 comprises, for data transmission with the second slave station 3, a code sending circuit 105, a modulation circuit 106, a demodulation circuit 107 and a code receiving circuit 108. The code receiving circuit 104 which receives data from the first slave station 2 is also connected to the first register 41 and the code receiving circuit 108 which receives data from the second slave station 3 is also connected to the second register 42.

The first slave station 2 comprises a demodulation circuit 201 connected to the external line 50A, a code receiving circuit 202 provided between such demodulation circuit 201 and internal bus 52, a code sending circuit 203 connected to the internal bus 52 and a modulation circuit 204 provided between the code sending circuit 203 and external line 50B. The code sending circuit 203 is connected to the register 21. Moreover, the second slave station 3 comprises a demodulation circuit 301 which demodulates the signal transmitted from the modulation circuit 106 of the master station 1 through the external line 55A, a code receiving circuit 302 provided between such demodulation circuit 301 and internal bus 53, a code sending circuit 303 connected to the internal bus 53 and a modulation circuit 304 provided between the code sending circuit 303 and external line 55B. The code sending circuit 303 is also connected to the register 31 which is connected to the slave clock 37.

Figure 6:
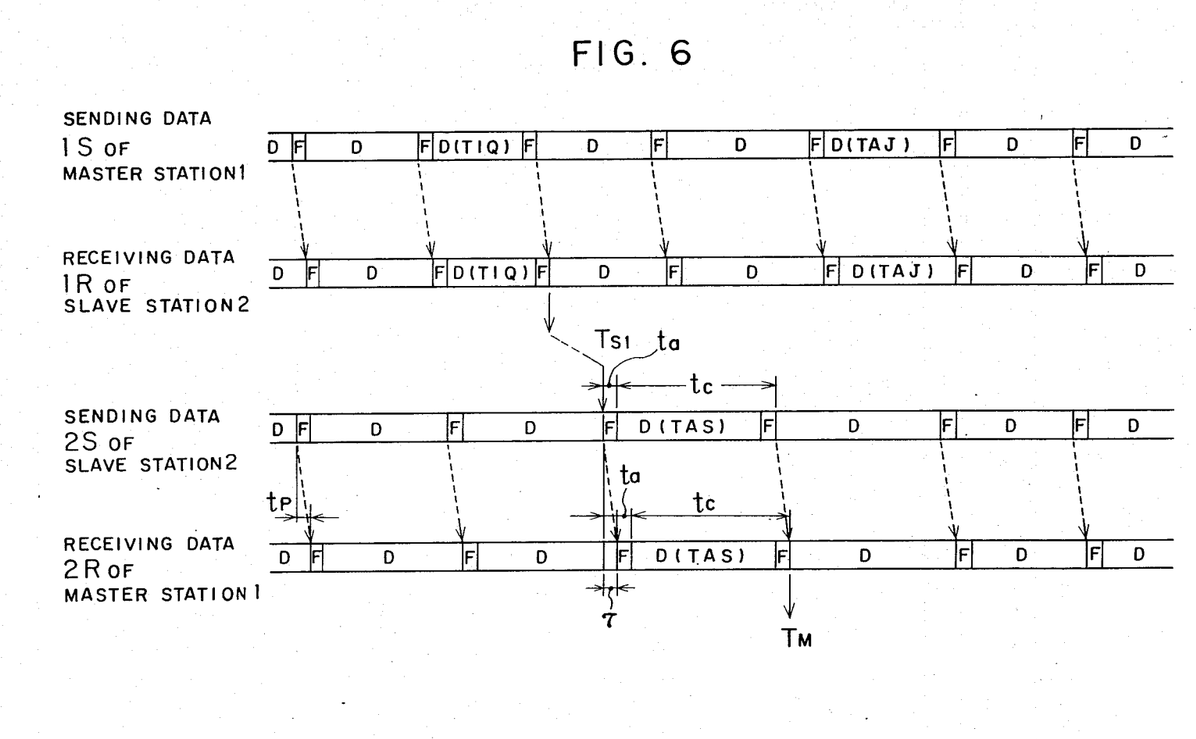
FIG. 6 is a pictorial presentation for explaining an outline of data to be transmitted or received between the master station and the slave station in the system illustrated in FIG. 5.

The data transfer operations in the SCADA system illustrated in FIG. 5 are explained by referring to the time chart of FIG. 6.

First, ordinary remote supervisory control and operation records are explained hereunder.

In FIG. 5, CPU 20 of the first slave station 2 scans conditions of contact to be supervised (such as auxiliary contacts of protection relay or circuit breaker, etc.) input to the input circuit 25 and stores such conditions. If status change occurs in the input contact, the address number of such contact and novel condition are transferred to the code sending circuit 203. The code sending circuit 203 always transmits the code to the master station 1. Upon reception of address of the status change contact and data of new status from CPU 20, the code sending circuit 203 transfers such address and data to the modulation circuit 204 in order to send the data to the master station 1 on the code frame next to the code being transmitted at that time. An example of code transmitted by the code sending circuit 203 is illustrated as the data 2S of the slave station 2 of FIG. 6. In FIG. 6, D is each frame of code and F is a flat indicating partition between the frames D. A pattern of flag F is fixed but the frame D changes including the length thereof in accordance with the content to be transmitted. Moreover, as the content, a control part for certain transmission and reception and a code check part are generally added in addition to the data to be transmitted. As an example of the code format, there is the high-level data link control (hereinafter referred to as HDLC) procedure.

Now, referring again to FIG. 5, the modulation circuit 204 modulates the code received from the code sending circuit 203 into the signal, for example the frequency shift keying (hereinafter referred to as FSK) signal which is suited to the signal transmission line and is resistive to influence of noise and then transmits it to the master station 1 through the external bus 50B which forms the signal transmission line. In the master station 1, the demodulation circuit 103 receives such signal, demodulates the signal into a DC pulse and then transfers the pulse to the code receiving circuit 104.

The code having reached the code receiving circuit 104 is delayed as long as the transmission delay time $t_P$ as in case of the sending code 2S like the receiving data 2R of the master station 1 illustrated in FIG. 6.

CPU 10 of the master station 1 reads the received content from the periodical scanning or the interrupt signal from the code receiving circuit 104. When status change data is received, CPU 10 updates contents of its own memory and changes the display on the display panel 11 through the output circuit 14. In addition, such status change is recorded by the typewriter 13 through the typewriter control circuit 16.

CPU 10 of the master station 1 also scans the input from the control desk 12 through the input circuit 15 and encodes the device address and status to be controlled (ON-OFF status), if selection, control command is issued for the device of the slave station 2 and applies such codes to the code sending circuit 101. The code sending circuit 101 is transmitting the code indicated as the sending data is of FIG. 6 and transmits such code on the one frame of such sending data code to the code receiving circuit 202 of the first slave station 2 through the modulation circuit 102, external bus 50A of transmission line 5 and demodulation circuit 201. CPU 20 of the first slave station 2 reads the received content by the periodical scanning or interrupt signal as a received data IR sent from the code receiving circuit 202 and gives control command to the designated device through the output circuit after code check and decoding.

The aforementioned operations are similar to those of the second slave station 3 and therefore explanation is not repeated here. The similar additional structure to the third, fourth and succeeding slave stations (not illustrated) realizes the exactly same operations.

Ordinary remote supervisory control and record of operation are explained above. However, in case the operations are recorded in the master station 1, there is no other way than the sequential record of times of the master clock 17 certified by CPU 10 of the master station 1 since the data of time at which the status change occurs is not inputted from each slave station 2, 3, ... in normal operation. But in case operations of protection apparatus and device is by far quicker than the time required for code transmission of data transmission system like the power system, accurate discrimination of operation sequence is impossible when data has reached the master station 1.

In order to solve such problem, the slave clocks 27, 37, ... are provided respectively to the slave stations 2, 3, ... and these slave clocks are synchronized with the master clock 17. When a status change occurs, times of slave clocks 27, 37, ... are also transmitted to the master station 1. Namely, if status change occurs at the contact being inputted to the input circuit 25 of the first slave station 2 explained previously, CPU 20 transmits the time of slave clock 27 to the master station 1 together with the address number of relevant contact and new status. Thereby CPU 10 of the master station 1 once stores such data to the memory of CPU 10 and arranges in order these data in the sequence of time added after acquisition of the data from the other slave station during a constant period and then outputs such data by the typewriter 13 through the typewriter control circuit 16. Thereby, an operator knows the correct operation time and its sequence.

In this case, the master clock 17 of the master station 1 and the slave clocks 27, 37, ... of the slave stations 2, 3, ... must be synchronized with considerable accuracy (for example, within several milliseconds) and operations for such synchronization will then be explained hereunder.

CPU 10 of the master station 1 issues a time survey command for checking the times of slave clocks 27, 37 ... once in every constant period (once in every hour to every day in accordance with accuracy of slave clock) to the slave stations 2, 3, ... through the code sending circuits 101, 105, ....

The slave station 2 is then explained. First, as the normal operation, the code sending circuit 203 sends a signal to the register 21 before a constant time $t_a$ determined previously of the code frame transmission starting time and the register 21 repeatedly reads and stores the time of slave clock 27 in such a timing as such signal is inputted. When CPU 10 of the master station 1 issues the time survey command, the code sending circuit 101 transmits it to the code receiving circuit 202 of the slave station 2 through the modulation circuit 102, external bus 50A forming the transmission line 5 and demodulation circuit 201. This operation is indicated as D (TIQ) in the sending data 1S of master station 1 in the time chart of FIG. 6.

When the code receiving circuit 202 receives the time survey command D (TIQ), CPU 20 of the slave station 2 puts the data stored in the register 21 on the next code frame. Here, since the data of register 21 is the time of slave clock 27, as indicated at the upper part of the sending data 2S of FIG. 6, before the time $t_a$ from the next frame (at the end of transmission of the previous frame in this example), if it is considered as $T_{S1}$, the CPU 20 transmits this $T_{S1}$ as the time data of slave clock 27 in the next frame D (TAS) to the code receiving circuit 104 through the code sending circuit 203, modulation circuit 204, external bus 50B and demodulation circuit 103.

The signal input to the code receiving circuit 104 is delayed as long as the transmission delay time T like the sending data 2S as in the case of receiving data 1R of FIG. 6. Upon reception of frame containing the time data of slave clock 27, the code receiving circuit 104 reads the time $T_M$ of master clock 17 at this time and then stores it in the register 41.

CPU 10 reads the time data $T_M$ stored in this register 41, calculates an estimated time $T_{S10}$ of the slave clock by subtracting a sum of the length $t_c$ of the 1-frame of code previously known, time $t_a$ up to the transmission of code from read of time of slave clock described previously and a transmission delay time $\tau$ from the time data $T_M$ and obtains a difference ($T_{S10} - \tau_{S1}$) between such estimated time and the time $T_{S1}$ of slave clock input with the frame of D (TAS) from the slave station and then stores it in the own memory as the time difference between the master clock 0 and slave clock 1.

Next, CPU 10 of the master station 1 transmits the time difference as the slave clock correction data to the code receiving circuit 202 of the first slave station 2 through the code sending circuit 101, modulation circuit 102, external bus 50A and demodulation circuit 201. The time chart of this operation is indicated by the frame D (TAJ) of FIG. 6.

When the code receiving circuit 202 receives the time correction data D (TAJ), CPU 20 of the first slave station 2 reads the time of slave clock 27, adds the time correction data (including the sign) thereto and sets the time of slave clock 27 to such time data.

Thereby, the time of slave clock 27 is synchronized with the time of master clock 17.

Time synchronization can be performed with the same operations for the slave clock 37 of second slave station 3 and the succeeding ones. The time correction data can also be obtained as a difference ($T_I - T_M$) between the estimated time $T_I$ of slave clock attained by CPU 10 of the master station 1 by adding a sum of the transmission delay time $\tau$, time $t_a$ up to transmission of code from reading of time of slave clock and the length $t_c$ of the 1-frame of code to the time $T_{S1}$ of slave clock 27 input, on the contrary from the above case, for example, from the first slave station 2.

The time synchronization method of the present invention can be applied to the data transmission system which always transmits the code and such system is also explained in the embodiments, but it is certain that this method of the present invention can also be adopted to the other systems, for example, those which do not always transmit the codes and each slave station transmits the codes in accordance with the polling from the master station.

Even in case of the structure of embodiment, the time correcting operations of slave clocks of slave stations may be done in parallel, for example, by providing individually the register 41, 42, ... of the master station 1 as in case of the embodiment, but it is also certainly possible that various structures may be employed, for example, the one common register may be used sequentially by realizing sequential correction for slave station by slave station.

In this case, it is also possible that the transmission delay time $\tau$ between the master station and slave stations is measured, when the data transmission system is installed, by the loop-back test, wherein, for example, the modulation circuit 102 and demodulation circuit 103 of the master station and the modulation circuit 204 and demodulation circuit 201 of the first slave station 2 are separated from the internal circuits in FIG. 5, an output of the demodulation circuit 201 is connected to the modulation circuit 204 and the time until appearance of change in the input code of the modulation circuit 102 of the master station 1 in the output of demodulation circuit 103 is measured and then is divided by 2, and then it is stored as the data in the memory of CPU 10 of the master station 1.

The time correcting operations are not always required to be executed for all digits (hour, minute, second, millisecond) of time in every operation and it is also possible that correction up to the digit of second (or time setting of slave clock by transmitting the absolute time) is carried out at the time of starting operation of device or with a period of long time and the slave clock time and bit length of its corrected data may be subtracted by once correcting millisecond every hour.

As explained heretofore in detail, according to the time synchronization method of the present invention, the slave station returns time data of the slave clock to the master station in accordance with the slave clock time survey command to the slave station from the master station in the data transmission system, while the master station calculates transmission delay time based on the time when the code including such time data has arrived from the slave station, obtains a time difference between the master clock and slave station by adding such transmission delay time as an element for calculation and synchronizes the times of the master station and slave station of data transmission system by correcting the time of the slave clock on the basis of such time difference data. Accordingly, the time synchronization method of the present invention is capable of executing the time correcting operation with reference to the absolute time and provides following effects for the practical use. First, it is no longer necessary to interrupt the other operations to be carried out by CPU provided in the master station and slave stations for the time synchronization and thereby an excessive load to be applied on CPU can be prevented.

In addition for the polling/selecting system, since it is also no longer necessary to separately measure the transmission delay time between the master station and slave stations and previously store such delay time as the data within the memory, etc. in CPU, the procedures required for such measuring operation and storing operation can be eliminated. Even in case of changing the transmission route, update of data measured and stored is not required and therefore the method for realizing time synchronization in the transmission system can be provided without any troublesome procedures.

Moreover, in case that this time synchronization method is applied to the system of automatic cyclical data transmission, the times of clocks provided in the master station and slave stations may be synchronized without suspending flow of data transmission, and alleviation of load applied on CPU and improvement of transmission efficiency can also be obtained.

What is claimed is:

1. A time synchronization method where a master station which is provided with at least a central processing unit (CPU), a master clock and a sending/receiving means is connected with slave station and/or stations having at least a CPU, a slave clock and a sending/receiving means through a data transmission line which assures bidirectional data transmission between said master station and said slave station and/or stations and a time of said slave clock and/or clocks is synchronized with a time of said master clock, said time synchronization method comprising:

the first step; said master station transmits a code of slave clock time survey command to said slave station and time $T_M$ of said master clock at timing of completing the transmission of such code is stored in a first register provided in said master station at the time of such transmission, the second step; a slave station which has received said code of slave clock time survey command stores time $T_s$ of said slave clock at timing of completing reception of said code received from said master station into a slave station register provided in said slave station and then transmits the time $T_s$ of said slave clock stored in said register to said master station on the next occasion of transmitting the code of slave clock time data, which occasion is preset so that the transmission to said master station is started after constant period $T_p$ from the timing of completing the reception of said code, the third step; said master station after receipt of the code said slave clock time data reads time $T_{De}$ of said master clock at timing of starting reception of said code and stores it in a second register, thereafter obtains a time difference $T_{D1}$ between said master clock and said slave clock, on the basis of the time data stored in said first register and said second register, respectively, said slave clock time $T_s$ received from the slave station and the transmission delay time $T_1$ calculated with said constant period $(T_p)$ up to the start of transmission of the code of said slave clock time data in said slave station $T_1 = (T_{De} - t_p - T_m)/2$, and transmits such time difference $T_{D1} = T_m + T_1 - T_2$ to said slave station in a code of time correction data, the fourth step; said slave station which has received said time difference $T_{D1}$ in said code of time correction data corrects the time of said slave clock based on such time difference.

2. A time synchronization method of the data transmission system according to claim 1, wherein said transmission delay time considered for obtaining time difference between said master clock and said slave clock in said third step is calculated by said CPU based on the data given to said master station sevral times in the past.

3. A time synchronization method where a master station which is provided with at least a central processing unit (CPU), a master clock and a sending/receiving means is connected with slave station and/or stations having at least a CPU, a slave clock and a sending/receiving means through the data transmission line and the time of said slave clock and/or clocks in the data transmission system which assures bidirectional data transmission between said master station and the slave station and/or stations are synchronized with the time of said master clock, said time synchronization method comprising the steps for;

transmitting from the slave station to the master station the time $T_{S1}$ of the slave clock which is read at a constant time $t_a$ before the partition of the frame of the code being transmitted by said slave station to said master station in accordance with the slave clock time survey command sent from said master station and is stored in a slave station register as the data to be transmitted the frame following said partition;

calculating at the master station an estimated slave clock time $T_{S10}$ by subtracting a sum of the length $t_c$ of one frame of the code transmitted, said constant time $t_a$ and transmission delay time T from said time $T_M$ of the master clock in such a timing as completing reception of said frame after such time $T_M$ is stored in the first register of the master station and then transmitting a difference between such time $T_{S10}$ and the time $T_{S1}$ of said slave clock, namely $(T_{S10} - T_{S1})$ to said slave station as the time correction data; and correcting at the slave station the time of the slave clock by adding said time correction data $(T_{S10} - T_{S1})$ received by said slave station to the actual time of slave clock.

4. A time synchronization method where a master station which is provided with at least a central processing unit (CPU), a master clock and a sending/receiving means is connected with at least one slave station and/or stations having at least a CPU, a slave clock and a sending/receiving means through a data transmission line and the time of said slave clock and/or clocks in the data transmission between said master station and slave station and/or stations is synchronized with the time of said master clock, said time synchronization method comprising the steps for; transmitting from the slave station to the master station time $T_{S1}$ of slave clock which is read at a constant time $t_a$ before the partition of the frame of the code being transmitted by said slave station to said master station in accordance with a slave clock time survey command sent from said master station and is stored in a slave station register as the data to be transmitted in the frame following said partition;

calculating at the master station an estimated slave clock time $T_I$ obtained by adding a sum of the transmission delay time T, time $t_a$ up to transmission of code from read of the time of said slave clock and the length $t_c$ of the 1-frame of code to the time $T_{S1}$ of said slave clock input as the data from said slave station after said master station stores the time $T_M$ of master clock in such a timing as completing reception of said frame to the first register of said master station and then transmitting a difference $(T_M - T_I)$ between such estimated slave clock time $T_I$ and the time $T_M$ of said master clock in such a timing as completing reception of the frame by said slave station as time correction data; and correcting at the slave station the time of the slave clock by adding such time correction data $(T_M - T_I)$ received by said slave station to the actual time of said slave clock.

* * * * *

UNITED STATES PATENT AND TRADEMARK OFFICE
CERTIFICATE OF CORRECTION

PATENT NO. : 4,807,259

DATED : February 21, 1989

INVENTOR(S) : TORAO YAMANAKA ET AL.

It is certified that error appears in the above-identified patent and that said Letters Patent is hereby corrected as shown below:

```
Col. 1, line 59, "result not" should be --not result--.
Col. 2, line 28, "said" should be --the--;
Col. 2, line 49, "transmittedand" should be --transmitted
         and--;
Col. 2, line 63, "3 the," should be --3, the--.
Col. 3, line 6, delete ";" and insert a comma --,--;
Col. 3, line 36, "on" should be --an-- (second occurrence).
Col. 5, line 9, delete the comma "," (second occurrence);
Col. 5, line 57, after "in" insert --the-- (second occurrence).
Col. 7, line 9, delete "as".
```

Signed and Sealed this

Twenty-second Day of January, 1991

Attest:

HARRY F. MANBECK, JR.

*Attesting Officer*  *Commissioner of Patents and Trademarks*